Patented Aug. 5, 1941

2,251,619

UNITED STATES PATENT OFFICE 2,251,619

MACHINE TOOL TRANSMISSION AND CONTROL MECHANISM

Werner Irving Senger, Madison, Wis., assignor to Gisholt Machine Company, Madison, Wis., a corporation of Wisconsin Application January 27, 1939, Serial No. 253,095

15 Claims. (Cl. 82—22)

This invention relates to machine tools and more particularly to transmission and control mechanism for lathes.

A purpose of the invention is to effect a machine tool including an improved transmission and control mechanism for relative bodily movement of a work piece and tool, and particularly for bodily movement of a lathe tool longitudinally and transversely on the lathe bed.

Another purpose is to effect a machine tool including transmission mechanism in an improved form for relative work and tool movement both at a cutting or feed rate, and at an idle or quick traverse rate, and improved control mechanism both for the manual and automatic control of such movements, and particularly for lathes.

Another purpose is to provide transmission and control mechanism particularly adapted for use with, and supplemental to, the transmission and control mechanism shown in a co-pending application, Serial No. 120,343, filed January 13, 1937.

Another purpose is to generally simplify and improve the construction and operation of transmission and control mechanism for one or more of the purposes previously mentioned, and particularly for lathes, and still other purposes will be apparent from this specification.

The invention comprises the construction, combination and relationship of parts as herein illustrated, described and claimed, and such modifications of the structure illustrated and described as are equivalent to the claims.

The same reference characters have been used to identify the same parts throughout, and in the drawings:

Figure 2 is an enlarged front elevation partly in section, of a tool carriage portion of the lathe of Fig. 1.

Figure 1:
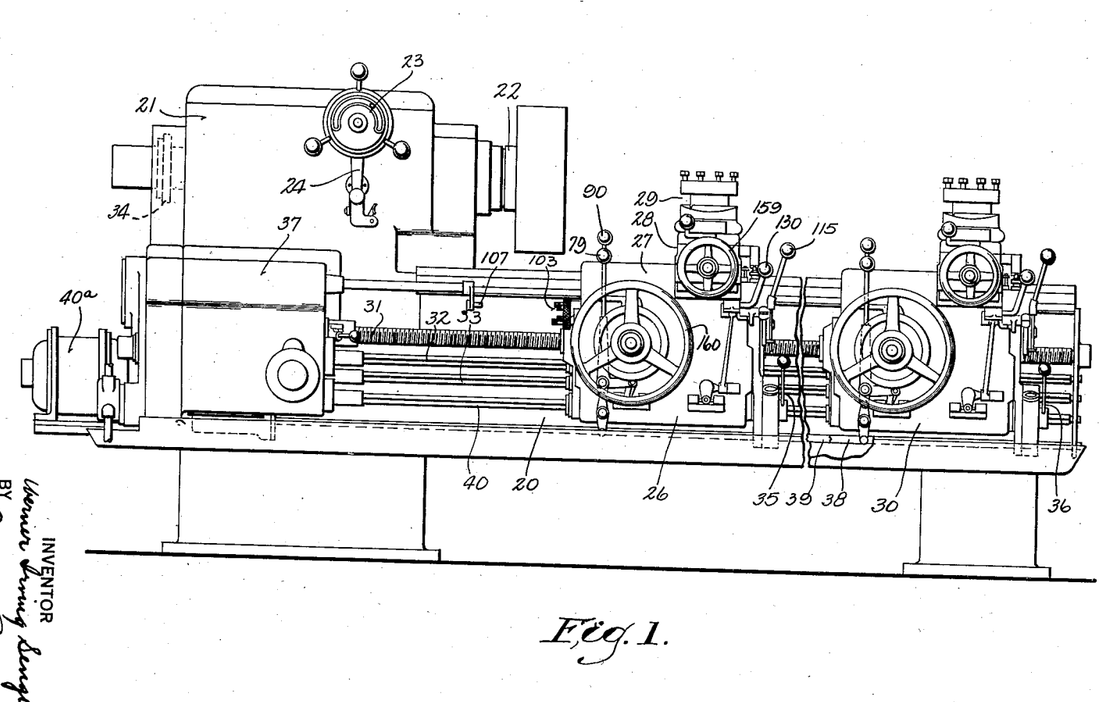
Figure 1 is a front elevation of a lathe incorporating the invention.

The lathe shown in Fig. 1 includes a bed 20, and a headstock portion generally denoted by the numeral 21 in which is rotatably mounted a work spindle 22 for which there is provided suitable transmission and control mechanism for effecting various spindle speeds in either direction. The spindle transmission and control mechanism may, for example, be similar to that shown in the Patent No. 2,054,141, issued September 15, 1936, and includes rate change elements which may be shifted into a variety of speed position combinations upon operation of a selective speed controller, such as the controller 23, the spindle transmission also including clutch and brake means in part controlled by the controller 23 and in part by a hand lever such as 24.

The lathe also includes a carriage generally denoted by the numeral 26, Fig. 1, which includes a main portion 27, guided on suitable slides or ways on bed 20 for reciprocatory movement parallel with the axis of spindle 22, a cross slide 28 guided on the portion 27 for reciprocatory movement transverse to the movement of portion 27, and a tool holder 29 mounted on the cross slide 28 and adapted to rigidly support suitable tools for operation on work pieces carried by spindle 22. The bed 20 is extended to the right in Fig. 1 to similarly guide a second tool carriage generally indicated by the numeral 30 which, as here shown, is substantially identical in construction and operative mechanism with the carriage 26.

Adjacent the front of the bed 20 there is a screw 31 which is fixed against both rotation and axial movement relative to the bed 20, and transmission shafts 32, 33 which respectively serve to transmit a feed rate drive to the different carriages 26, 30. Each of the feed rate shafts is driven from the spindle 22 as, for example, from a gear 34, Fig. 1, but through different rate change mechanism, not here shown, separately controlled for rate selection from hand levers 35, 36 respectively mounted on the carriage which is driven from the corresponding feed rate shaft, the rate changers being carried by a unit generally denoted by the numeral 37, and respectively connected for control from the different hand levers by shafts 38 and 39. A quick traverse rate shaft 40 is also adjacent the front of bed 20, and is driven at a relatively rapid rate from a motor, such as motor 40a, Fig. 1. Shaft 40 serves to transmit quick traverse rate drive to either of the carriages 26, 30 according to control mechanism later described.

The trains connecting the spindle gear 34 with each of the feed rate shafts 32, 33, and the mechanism for controlling the rate changers of each of these trains, as well as the transmission mechanism connecting motor 40a with the quick traverse rate shaft 40 is, preferably, the same as the mechanism fully disclosed in said co-pending application, Serial No. 120,343, and therefore will not here be described.

The transmissions connecting the feed rate shafts 32, 33 and quick traverse rate shaft 40 for longitudinal movement of the carriages 26, 30 and for transverse movement of the respective cross slides, as well as the control mechanism therefor, is substantially identical for each carriage, and will therefore be described in detail only for the carriage 26.

Figure 3:
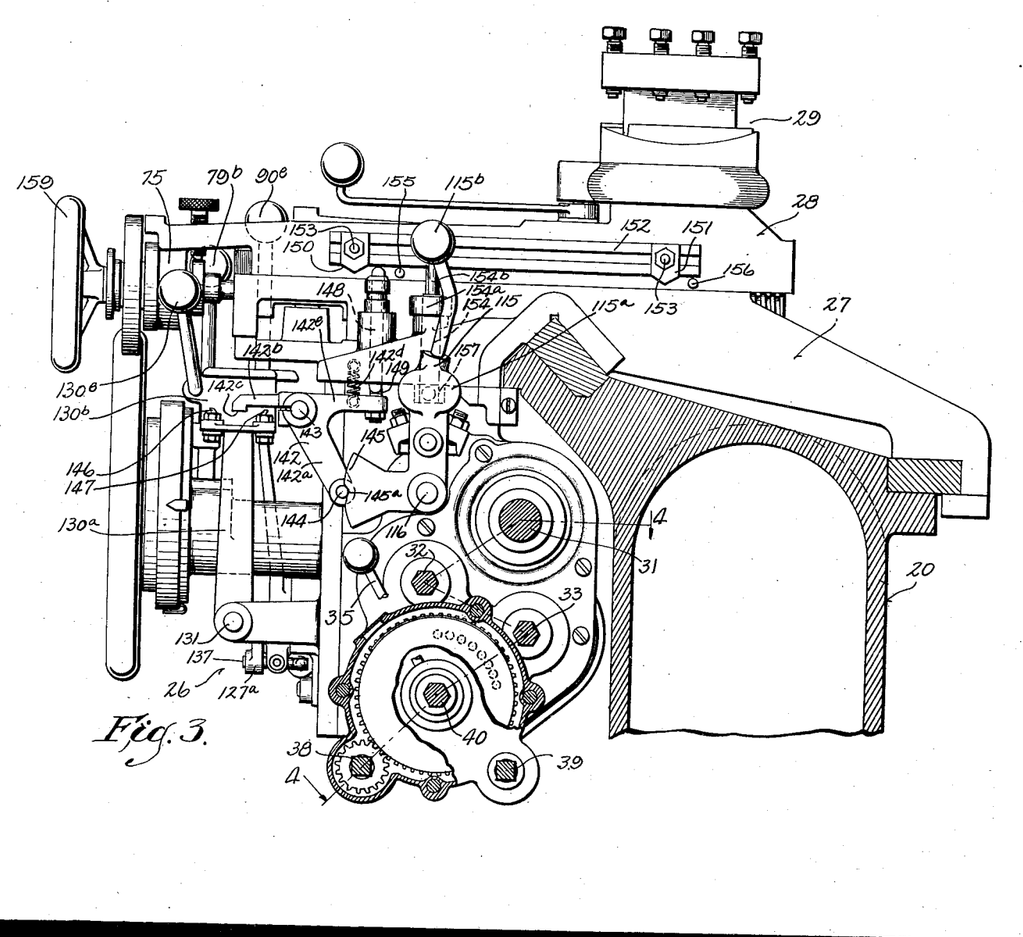
Figure 3 is an end elevation of the same tool carriage and its support viewed from the right in Fig. 2 and partly in section.
Figure 4:
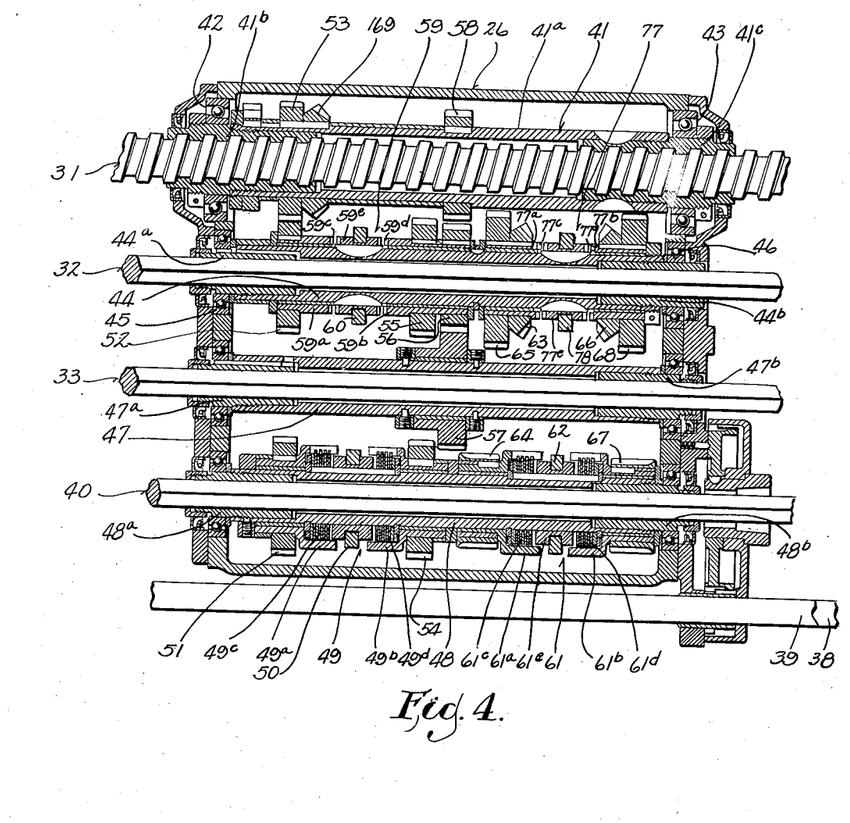
Figure 4 is a sectional development of some of the transmission mechanism of the tool carriage of Fig. 2, taken along line 4—4 of Fig. 3.

Referring to Figs. 3, 4, the stationary screw 31 extends through a suitable bore in the carriage apron, there being a sleeve nut device 41 engaged by the screw and rotatably supported but fixed against axial movement relative to the carriage by suitable bearings such as 42, 43. Nut device 41 includes a sleeve portion 41a and the nut portions 41b, 41c each engaging screw 31 and relatively axially adjustable for eliminating backlash.

A sleeve device 44, Fig. 4, rotatably supported by bearings 45, 46, is co-axial with feed shaft 32 and comprises bushing portions 44a, 44b having internal hexagon bores engaging the hexagon exterior of the feed shaft to drive the sleeve device. A similar sleeve device 47, having bushings 47a, 47b, is co-axial with the feed shaft 33 but in the carriage 26 is not utilized except to rotatably support reverser gearing, later described. Another sleeve device 48, similarly to the device 44, is provided with bushings 48a, 48b which provide hexagon bores to drive the sleeve 48 from the quick traverse shaft 40.

Figure 7:
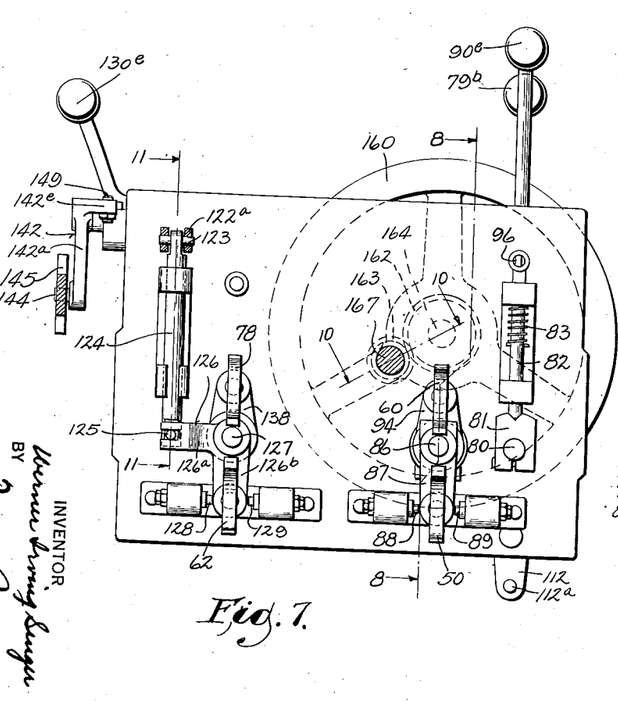
Figure 7 is a rear view of a front plate of the tool carriage of Fig. 2 and of certain mechanism carried thereon.

The several sleeve devices 41, 44, 47, 48, Fig. 4, are interconnected to provide quick traverse reverser and feed reverser devices respectively operative between the quick traverse shaft 40 and feed shaft 32 and the nut sleeve device 41, whereby to provide alternative longitudinal feed or quick traverse rate to the carriage 26, in either direction, as follows:

For quick traverse rate drive of the nut device 41 there is provided a reverser clutch generally denoted by the numeral 49, Fig. 3, which includes a plurality of spaced outer clutch members 49a, 49b respectively associated with groups of clutch friction plates 49c, 49d, the plates of each group being slidably alternately keyed with the associated outer clutch member and with the sleeve 48, the plates of the different groups being alternatively engageable, to selectively drive the different outer clutch members 49a, 49b, by the means of an axially slidable clutch spool 49c which may be shifted in either axial direction to set up the drive through the one or the other clutch member 49a, 49b, or to position the spool centrally to interrupt the drive, by the means of suitable shifter means, later more fully described, including a fork member 50, Figs. 4, 7, engaging an annular groove in the spool.

The quick traverse reverser clutch members 49a, 49b are each connected with carriage nut sleeve 41, respectively through the train of gears comprising gears 51, 52, 53, and through the train comprising gears 54, 55, 56, 57, 58, the arrangement being such that shifting of the clutch spool 50 in the one direction drives the carriage sleeve nut 41 at quick traverse rate in the one direction and opposite shifting of the spool drives the sleeve nut in the other direction, while an intermediate position of the spool disengages both groups of friction plates 49c, 49d and permits the sleeve nut to be driven at feed rate, or to remain stationary. It will be understood that the gears 51, 52, also 54, 55, also 57, 58, although not shown meshed in the developed section, Fig. 4, are meshed in driving engagement in the actual shaft position shown in Fig. 3.

For feed rate drive of the nut sleeve 41 there is provided a feed reverser clutch generally denoted by the numeral 59, Fig. 4. Clutch sleeves 59a, 59b are rotatably supported on the sleeve 44 and respectively provided on their inner adjacent ends with clutch jaws 59c, 59d. A clutch member 59e is slidably keyed on sleeve 44 and positioned between the sleeves 59a, 59b, the clutch member having end clutch faces alternatively engageable with the clutch jaws 59c, 59d as the clutch member is axially shifted in opposite direction, and having an intermediate position disengaging the member from either clutch engagement. The clutch sleeves 59a, 59b respectively have fixed thereon the gear 52, and the two gears 55, 56 of the trains previously described, and therefore are respectively connected with the carriage nut sleeve 41 through a gear train including the gears 52, 53 and through a train including the gears 56, 57, 58, these trains operating to drive the nut sleeve 41 in opposite directions according to the engagement of the one or the other of the clutch sleeves by the clutch member 59e. Clutch member 59e may be shifted by a fork 60, Figs. 4, 7, engaging a suitable annular groove in the clutch member, whereby to drive the carriage in either direction at a feed rate, or to centrally position the clutch member, whereby to drive the carriage at a quick traverse rate or to stop the carriage, as will later be more fully described.

For quick traverse rate drive of the cross movement of tool slide 29 in either direction there is provided a reverser clutch generally denoted by the numeral 61, Fig. 4, which, similarly to reverser clutch 49, includes a plurality of spaced outer clutch members 61a, 61b respectively associated with groups of clutch friction plates 61c, 61d, the plates of each group being slidably alternately keyed with the associated outer clutch member and with the sleeve 48, the plates of the different groups being alternatively engageable to drive the different outer clutch members by the means of an axially slidable clutch spool 61e, which may be shifted in either axial direction to set up the drive through the one or the other clutch member 61a, 61b, or to position the spool centrally to interrupt the drive, by the means of suitable shifter means, later more fully described, including a fork member 62, Figs. 4, 7, engaging an annular groove in the spool.

The cross slide quick traverse reverser clutch members 61a, 61b are respectively connected to a bevel gear 63 through the gears 64, 65 and to a bevel gear 66 through the gears 67, 68, it being understood that the gears 64, 65, and also the gears 67, 68, are meshed in the actual shaft positions shown in Fig. 3. The bevel gears 63 and 66 each mesh with a bevel gear 69, Fig. 5, which transmits motion to a cross feed screw 70 through a shaft 71, bevel gears 72, 73 and a sleeve 74 slidably splined on the screw, the screw being fixed for axial movement with the cross slide 28, by thrust bearing means such as 75, and engaging a nut 76 fixed in the carriage.

For feed rate drive of the cross movement of tool slide 28 there is provided a feed reverser clutch generally denoted by the numeral 77, Fig. 4. Similarly to reverser clutch 59, clutch sleeves 77a, 77b are rotatably supported on the sleeve 44 and respectively provided on their inner adjacent ends with clutch jaw 77c, 77d. A clutch member 77e is slidably keyed on sleeve 44 and positioned between the sleeves 77a, 77b, the clutch member having end clutch faces alternatively engageable with the jaws 77c or 77d as the clutch member is shifted in opposite directions, and having an intermediate position disengaging the member 77c from either clutch engagement. The clutch sleeves 79a, 79b are respectively fixed with the bevel gears 63, 64 and transmit feed rate motion to the cross slide 28 through the previously described train which includes bevel gear 69 and cross feed screw 70. Clutch member 77e may be shifted by a fork 78, Figs. 4, 7, as later more fully explained.

Figures 8, 8A, 9:
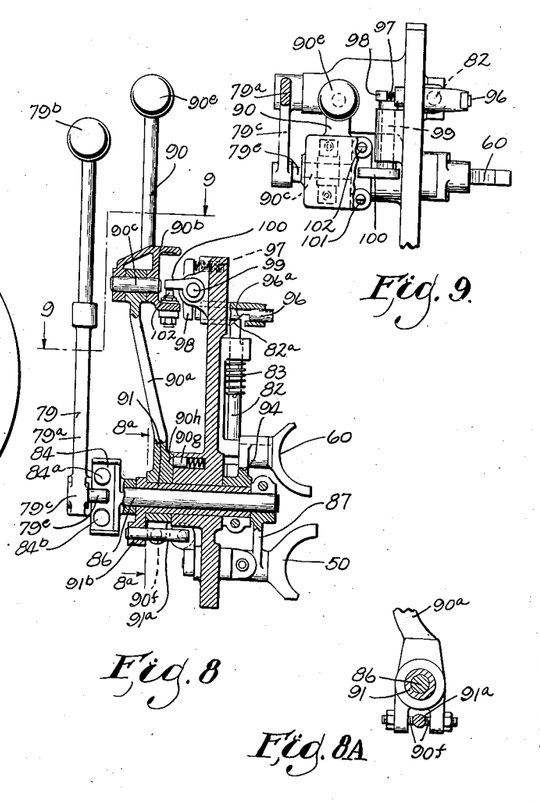
Figure 8 is a vertical section taken approximately along line 8—8 of Figs. 2 and 7.
Figure 8A is a fragmental section taken along line 8A—8A—of Fig. 8.
Figure 9 is a partial top view of some of the mechanism shown in Figs. 2 and 7, viewed from line 9—9 of Fig. 8.

For manual operation of the carriage quick traverse reverser clutch 49, Fig. 4, there is provided control mechanism as follows: A bell crank lever 79, Fig. 2, is fixed with a shaft 80, Figs. 2, 7, and includes an arm 79a carrying a hand grip portion 79b, and an arm 79c carrying a pin 79e, Figs. 2, 8. Lever 79 is normally yieldably retained in central position by detent means including a notched cam 81, Fig. 7, fixed on shaft 80, and a spring pressed plunger 82, but when the lever is shifted against the resistance of a spring 83 the pin 79e strikes angularly against the end faces of the one or the other of abutment pins 84a, 84b, Figs. 2, 8. Pins 84a, 84b are carried on oppositely extended arms of a lever 84 fixed on a shaft 86 upon which is also fixed a lever 87 which pivotally carries the quick traverse clutch fork member 50, Figs. 4, 8. The fork member 50 is normally yieldably retained in central clutch disengaging position by opposed spring plungers 88, 89, Fig. 7. When the manual lever 79 is shifted in either direction by the hand grip 79b the carriage quick traverse clutch 49 will be engaged to move the carriage 26 in corresponding direction, by the mechanism described, but immediately when lever 79 is released the quick traverse reverser clutch 49 will also be released from either previously engaged position.

For manual operation of the carriage feed reverser clutch 59, Fig. 4, there is provided control mechanism as follows: A lever, generally denoted as 90, Figs. 2, 8, includes an arm portion 90a pivoted on a rotatable sleeve 91 and another portion 90b pivoted on arm 90a by the means of a pivot pin 90c, the portion 90b carrying a hand grip 90e. The portion 90b is normally yieldably retained in central position relative to arm 90a by the means of opposed springs 92, 93, Fig. 2. The arm 90a is restrained for rotational movement with the sleeve 91 by the means of adjustable abutment screws 90f, Figs. 8, 8A, respectively engaging opposite sides of a pin 91a which is fixed in an arm 91b carried on sleeve 91. The sleeve 91 also has fixed therewith a lever 94 which pivotally carries the feed reverser clutch for member 60, Figs. 4, 8. The feed clutch is normally yieldably retained in central disengaged position by opposed spring plungers 95, Figs. 2, 8, respectively bearing against opposite sides of the pin 91a. Associated with the hub of lever arm 90a there is a detent mechanism including a spring plunger 90g, Fig. 8, there being notches or sockets, such as 90h, suitably positioned to mark the lever positions.

Interlock means are provided between the described controls for carriage quick traverse reverser clutch 49 and feed reverser clutch 59, as follows: The plunger 82, Figs. 7, 8, 9, which cooperates with cam 81 as previously described, at its upper end has an angular face 82a engaging a complementary angular face 96a on a plunger 96, the last mentioned plunger being normally urged to the right in Fig. 8 by a spring 97 operating on a lever 98 which is fixed on a shaft 99. Shaft 99 also has fixed therewith a lever arm 100, Figs. 8, 9, normally retained in the position shown in Fig. 8 by the spring 97, but forced upwardly therefrom by the cam 81, plunger 60 and rod 96 whenever the lever 79 is shifted to engage quick traverse clutch 49 in either direction. The feed lever portion 90b carries spaced abutment pins 101, 102, Figs. 8, 9, and whenever the feed lever 90 is shifted to engage the feed clutch one or the other of these pins moves past the end of lever 100 and springs into engagement behind the lever end in a position of abutment normally preventing disengagement of the feed clutch as long as the lever 100 remains in the position shown in Fig. 8 or until the feed clutch lever is manually reversely shifted to swing the engaged pin downwardly. But if lever 100 is shifted upwardly from the position of Fig. 8, as will occur, for example, when quick traverse clutch lever 79 is shifted to either clutch engaged position, such upward movement will free the engaged pin 101 or 102 and the mechanism previously described will then immediately shift the feed clutch to disengaged position. For manual disengagement of the feed clutch the feed lever portion 90b which carries the abutment pins 101, 102 may be manually swung about the pivot pin 90c to disengage the engaged abutment pin, as previously pointed out.

Figures 12, 14, 15:
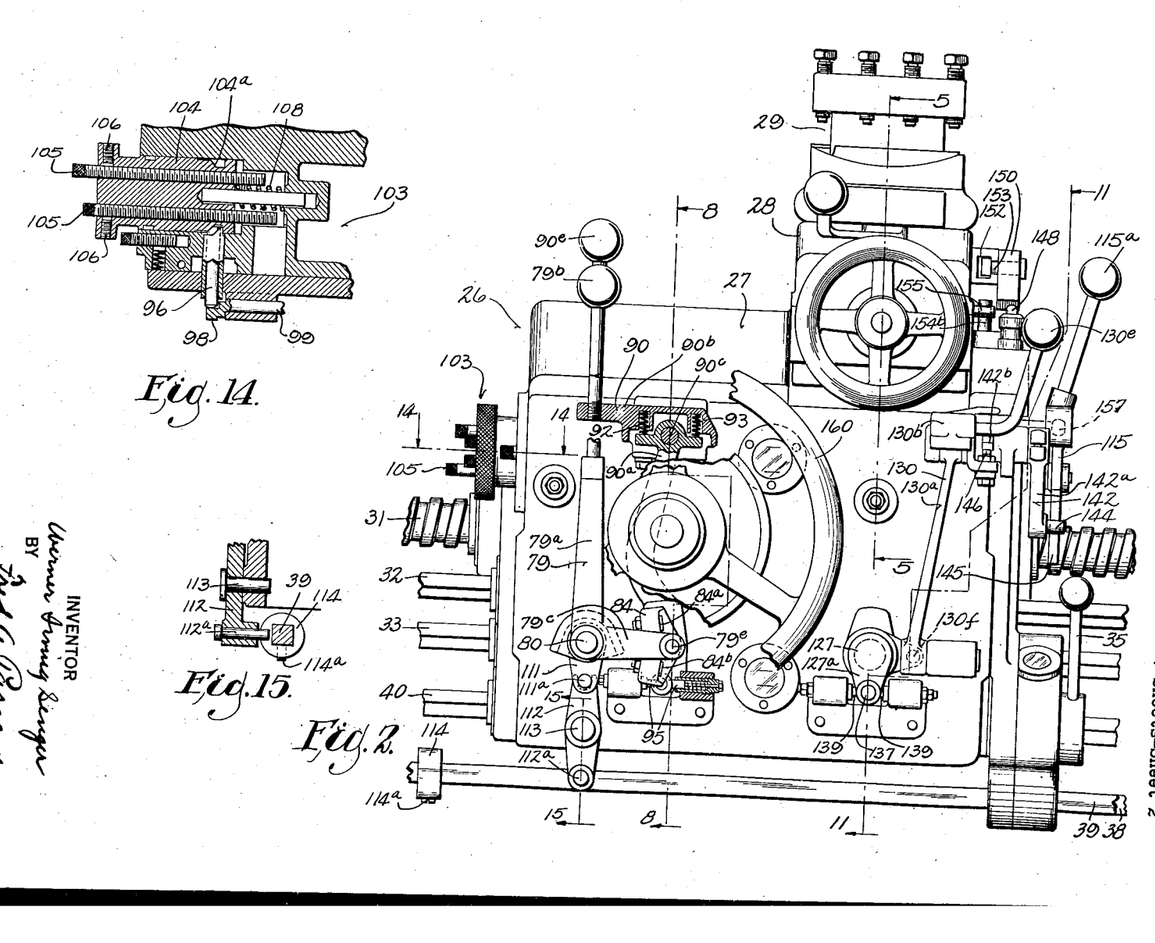
Figure 14 is a partial section taken along line 14—14 of Fig. 2.
Figure 15 is a fragmentary section taken along line 15—15 of Fig. 2.

For power operated disengagement of the feed clutch 59, there is provided a multiple-stop device generally denoted by the numeral 103, Figs. 1, 2, 14. Stop device 103 includes a sleeve 104, Fig. 14, rotatably mounted on carriage 26 and carrying a number of adjustably projecting stop screws such as 105, which may be locked in adjusted position by lock screws such as 106, the stop screws 105 being at equal distance from the axis of the sleeve 104 to be rotatable one at a time into position to contact, during carriage travel to the left in Fig. 1, an abutment member 107, which is suitably adjustably fixed relative to bed 20. The sleeve and stops are normally forced to the left in Fig. 14 by a spring 108 but the continued movement of the carriage after such contact will force the sleeve to the right.

The sliding rod 96 has an angular end portion engaging a complementary angular face 104a of an annular groove in sleeve 104, in any position of sleeve rotation, and during the right-hand sleeve movement, from the position shown in Fig. 14, the rod 96 will be forced outwardly. As previously pointed out, the outer end of rod 96 engages the lever arm 98 fixed on the trip shaft 99 in a manner such that the outward rod movement swings the trip shaft in direction to move the trip arm 100, Figs. 8, 9, upwardly, to effect disengagement of the feed clutch, as previously described.

Means are provided for power disengagement of the quick traverse clutch 49, as follows: The shaft 80, Fig. 2, of quick traverse lever 79, has fixed therewith a lever arm 111 which carries a pin 111a projecting to engage the forked end of a lever 112 pivoted on a stud 113, the other end of lever 112 carrying a pin 112a which projects rearwardly into the path of travel of a dog member 114 which is adjustably fixed, by the means of a screw 114a, on a rod that extends longitudinally of the bed 20. In the present instance the rod 39, primarily used for feed rate control, as previously pointed out, is also used for adjustably mounting the dogs. The arrangement of the transmission and control mechanism is such that the movement of hand lever 79 which effects carriage movement to the left in Fig. 2, also positions the trip pin 112a to the left, to be contacted by a dog, such as dog 114, positioned at the left of the carriage, and vice versa. Dogs such as 114 may be permanently fixed in position to trip the quick traverse movement of the carriage before the carriage reaches the limit of its movement, whereby to prevent damage.

The described transmission and control connections for carriage 26 are such that, provided the feed drive shaft 32, Fig. 4, and quick traverse drive shaft 40 are operated in normal directions, the shifting either of the quick traverse reverser control lever 79 or of the feed reverser control lever 90 to the left in Fig. 1, will effect movement of carriage 26 to the left, and vice versa. The friction type quick traverse reverser clutch 49 is adapted to slip under overload, whereby to prevent damage if the positive jaw type feed reverser clutch 59 should, by accident, be manually engaged at the same time that the quick traverse clutch is being manually retained in engagement. For the normal control operations the feed and quick traverse levers 90, 79 may be independently operated to effect the desired rate and direction of carriage travel, but the described interlock means insures that an engaged feed clutch will be immediately automatically tripped out of either direction of engagement when the quick traverse clutch is engaged in either direction and, in addition to preventing damage, such interlock means permits the operator to effect either direction of quick traverse instantly, by operation of only a single control lever, irrespective of whether the feed clutch was or was not previously engaged. The separate feed and quick traverse levers, each independently controlling the resulting direction of carriage travel are of material benefit in avoiding confusion of the operator such as may arise, for example, where a single lever effects various results according to movements in different paths.

For manual operation of the cross slide quick traverse reverser clutch 61, Fig. 4, there is provided control mechanism as follows: A lever generally denoted as 115, Figs. 1, 3, is pivoted on a stud 116 and includes an arm 115a carrying a hand grip portion 115b. Fixed with the arm portion 115a there is a pin 117. Lever 115 is normally held in central position, as later described, but when the lever is swung in the one or the other direction about its pivot the projecting end 117a, Fig. 11, of pin 117 strikes angularly against the end faces of the one or the other of abutment pins 118, 119 which are respectively carried on oppositely projecting ends of a lever 120, Figs. 11, 12, which is fixed with a shaft 121. Also fixed on shaft 121 there is a lever 122, which is extended for the slotted end 122a thereof to engage a pin 123 fixed with a vertically movable rod 124, Figs. 7, 11. At its lower end the row 124 carries another pin 125 engaging the slotted end of arm 126a of a bell crank 126 which is carried for pivoted movement on the projecting end of a shaft 127, Figs. 7, 12, and has another arm 126b projecting downwardly and pivotally carrying the quick traverse clutch fork member 62, Figs. 4, 7. The fork member 62 is normally held in central clutch disengaging position by opposed spring plungers 128, 129, Fig. 7. When the manual lever 115 is shifted in either direction by the hand grip 115b the cross slide quick traverse clutch 61 will be engaged to move the cross slide 28 in corresponding direction, but immediately when lever 115 is released the quick traverse reverser clutch will also be released from either previously engaged position.

For manual operation of the cross slide feed reverser clutch 77, Fig. 4, there is provided control mechanism as follows: A lever generally denoted as 130, Figs. 2, 3, 11, includes an arm portion 130a having a pivot pin 131, Figs. 11, 12, and another portion 130b pivoted on arm 130a by the means of a pivot pin 130c, the portion 130b carrying a hand grip 130e. The portion 130b is normally retained in central position relative to arm 130a by the means of opposed springs 132, 133, Fig. 11, in a manner similar to that shown for the similar arm portion 90b, Fig. 2, which therefore need not here be described in detail. The lever portion 130g provides a bell crank portion 130f, Figs. 11, 12, 13, engaging a suitable recess in an arm 134a of a member 134 which is carried on the shaft 127 and is restrained for rotational movement with the shaft by the means of adjustable abutment screws 135, 136, Figs. 11, 13, respectively engaging opposite sides of a pin 137 which is rigidly fixed in an arm portion 127a that is integrally formed as an enlarged head portion of the shaft 127. The shaft 127 also has fixed therewith, on its inner end, an arm 138, Figs. 7, 12, which pivotally carries the feed reverser clutch fork member 78, Figs. 4, 7. The feed clutch is normally yieldably retained in central disengaged position by opposed spring plungers 139, 139, Figs. 2, 11, respectively bearing against opposite sides of the pin 137. Associated with the hub of member 134, Fig. 11, there is a detent mechanism including a spring plunger 140, there being notches or sockets, such as 141, suitably positioned to mark the position of lever 115.

Interlock means are provided between the controls for cross slide quick traverse reverser clutch 61 and feed reverser clutch 77, as follows: A multiple arm lever generally denoted by the numeral 142, Figs. 2, 3, is carried on a pivot pin 143, and has an arm portion 142a carrying a pin 144 cooperating with a cam portion 145 fixed on the lever 115, and another arm portion 142b carrying an abutment member 142c. The lever 142 is normally urged in the direction for pin 144 to engage cam 145 by any suitable means, such as a spring 142d operating on another arm 142e of the lever. In the central position of the lever 115, wherein the quick traverse clutch 61 is disengaged, the pin 144 is engaged in a notch 145a in the cam portion 145, and abutment portion 142c then is in the position shown in Fig. 3, but will be forced upwardly by the operation of cam 145 on the pin 144 whenever the quick traverse lever 115 is shifted to engage quick traverse clutch 61 in either direction. The feed lever portion 130b carries two spaced abutment pins 146, 147, Fig. 3, and whenever the feed lever 130 is shifted to engage the feed clutch 77, one or the other of pins 146, 147 moves past the abutment member 142c and springs into engagement behind the abutment member to normally prevent the disengagement of the feed clutch as long as the abutment member remains in the normal position shown in Fig. 8, or until the feed clutch lever is reversely manually shifted to swing the engaged abutment pin downwardly about the pivot 130c, Fig. 11, of the lever portion 130b. But if the abutment 142c is shifted upwardly from the position shown in Fig. 3, as will occur, for example, by operation of the cam 145 on pin 144 when quick traverse lever 115 is shifted to either clutch engaged position, such upward movement will free the engaged abutment pin 146 or 147 and the mechanism previously described will then immediately shift the feed clutch 77 to disengaged position. For manual disengagement of the feed clutch the feed lever portion 130a which carries the abutment pins 146, 147 may be swung about the pivot pin 130c to free the engaged abutment pin, as previously pointed out.

Figure 6:
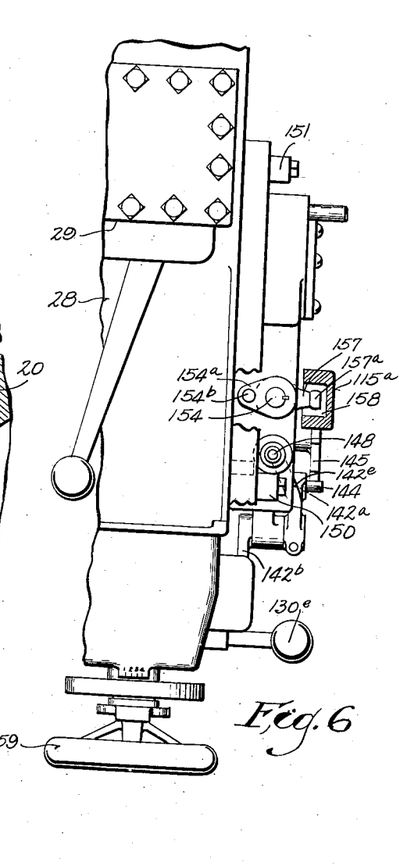
Figure 6 is a partial plan view of the upper slide of the tool carriage of Fig. 2.

The cross slide feed reverser clutch 77 may be power operated by trip mechanism as follows: A plunger 148, Figs. 2, 3, 6, is carried on carriage 26. The lower plunger end rests against an adjustable abutment screw 149 which is carried by the lever arm 142e, and in the normal position of the abutment member 142c, that is to say, in the position shown in Fig. 3, the upper end of plunger 148 projects upwardly into the path of movement of dogs 150, 151 which are adjustably fixed at the side of cross slide 28, see Fig. 3, by the means of a T slot 152 and T bolts such as 153. When either dog 150, 151 is positioned to contact the plunger 148, during travel of the cross slide in either direction the plunger will be forced downwardly in Fig. 3, whereby to swing lever 142 to move the abutment member 142c upwardly, out of engagement with either abutment pin 146, 147, and thereby to disengage the feed clutch as previously explained.

The cross slide quick traverse reverser clutch 61 may be power operated by trip mechanism as follows: A trip post or pivot shaft 154, Figs. 3, 6, has fixed on the upper end thereof a trip member 154a carrying an upstanding trip pin portion 154b, which projects into the path of movement of trip pins 155, 156, Figs. 2, 3, which are rigidly fixed in spaced positions on cross slide 28. At its lower end the post 154 has fixed thereon a member 157, Figs. 3, 6, which has a lever end 157a projecting within a suitable slot or socket 158 in the lever portion 115a of the quick traverse lever 115. The construction is such that when the quick traverse lever 115 is shifted in a direction to effect rearward movement of the cross slide 28 the lever end 157 will be contacted to swing the trip pin 154 forwardly, and vice versa, whereby in either direction of quick traverse movement the trip pin will be positioned to be contacted and shifted back to central position by the one or the other of trip pins 155, 156, effecting disengagement of the quick traverse clutch before the cross slide has reached the limit of its movement.

The described transmission and control connections for cross slide 28 are such that, provided the feed drive shaft 32, Fig. 4, and quick traverse drive shaft 40 are rotated in the normal direction required to effect the direction control effects previously pointed out for carriage 26, similar direction control effects will be had for the cross slide. That is to say, the shifting either of the quick traverse reverser control lever 115 or of the feed reverser control lever 130 to the left in Fig. 3 will effect movement of the cross slide 28 to the left, and vice versa. Similarly, the advantages of use of friction type quick traverse clutches and of independently operable but interlocked feed and quick traverse levers, previously described for the carriage transmission and control mechanism, apply also to the described transmission and control mechanism of the cross slide.

Figure 5:
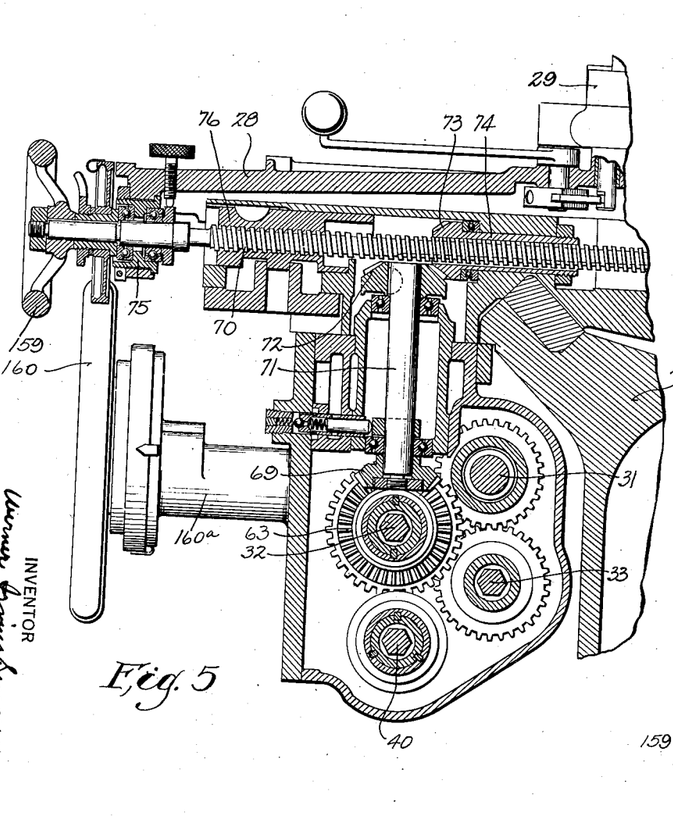
Figure 5 is a partial vertical section through the tool carriage of Fig. 2, taken along line 5—5 of Fig. 2.
Figures 10, 11, 12, 13:
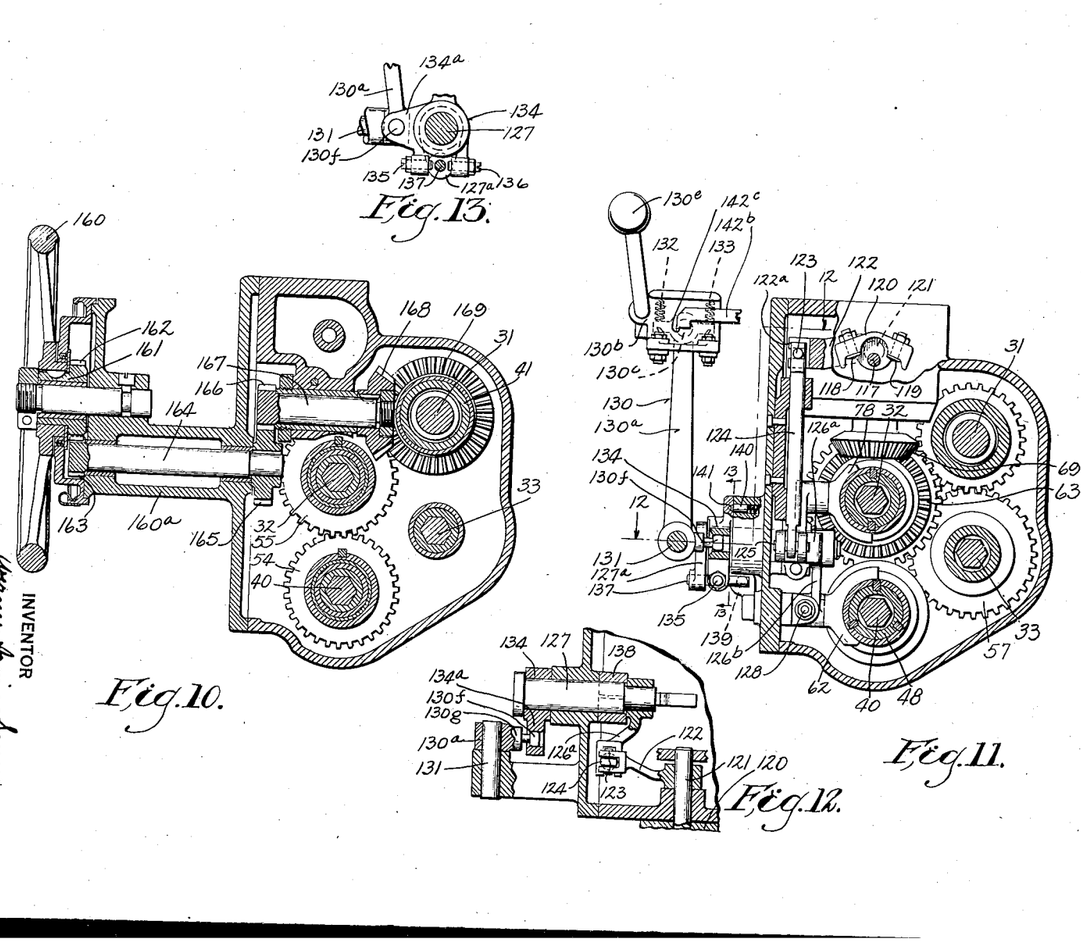
Figure 10 is a partial sectional development showing a hand wheel train in the carriage of Figs. 2 and 7, the development being substantially along line 10—10 of Fig. 7.
Figure 11 is a partial vertical section taken approximately along the line 11—11 of Figs. 2 and 7.
Figure 12 is a partial section taken approximately along line 12—12 of Figure 11.
Figure 13 is a partial section taken approximately along line 13—13 of Fig. 11.

Means are provided for manual movement of both the carriage 26 and of the cross slide 28. For the cross slide movement a hand wheel 159, Figs. 1, 5, is fixed directly on the cross feed screw 70, together with associated deal mechanism, in the usual manner. For the carriage movement, a hand wheel 160, Figs. 1, 10, is carried on an arm 160a and is connected with the sleeve nut 41, Figs. 4, 10, by the means of a sleeve 161, meshed gears 162, 163, shaft 164, meshed gears 165, 166, a shaft 167, and a bevel gear 168 which meshes with a bevel gear 169 fixed on the nut sleeve.

What is claimed is:

1. In a lathe, the combination of a bed, a horizontal work spindle rotatably supported adjacent one end of said bed, a tool carriage guided on said bed for reciprocatory movement parallel with the axis of said spindle, and transmission and control mechanism for said carriage movement including rotatable feed rate and quick traverse rate members each axially parallel with said spindle, a plurality of shiftable reversers respectively for connecting different of said rotatable members for movement of said carriage and each shiftable to intermediate motion interrupting position, said reversers being collectively operable for carriage actuation in either direction of said reciprocatory movement at either of said rates, a plurality of manually operable shifters respectively for different of said reversers, and means for shifting one of said reversers to interrupting position upon shifting of the other reverser to either direction position thereof.

2. In a lathe, the combination of a bed, a horizontal work spindle rotatably supported adjacent one end of said bed, a tool carriage guided on said bed for reciprocatory movement parallel with the axis of said spindle, and transmission and control mechanism for said carriage movement including rotatable feed rate and quick traverse rate members each axially parallel with said spindle, a plurality of shiftable reversers respectively for connecting different of said rotatable members for movement of said carriage and each shiftable to intermediate motion interrupting position, said reversers being collectively operable for carriage actuation in either direction of said reciprocatory movement at either of said rates, and a plurality of shifter means respectively for different of said reversers and each including a hand grip portion carried in said carriage for bodily movement therewith and for movement relative to the carriage in a path substantially parallel to the path of carriage movement, the hand grip portion for each of said shifter means being connected for reverser operation to effect carriage movement in the same direction that the hand grip is moved.

3. In a lathe, the combination of a bed, a horizontal work spindle rotatably supported adjacent one end of said bed, a tool carriage guided on said bed for reciprocatory movement parallel with the axis of said spindle, and transmission and control mechanism for said carriage movement including rotatable feed rate and quick traverse rate members each axially parallel with said spindle, a plurality of shiftable reversers respectively for connecting different of said rotatable members for movement of said carriage and each shiftable to intermediate motion interrupting position, said reversers being collectively operable for carriage actuation in either direction of said reciprocatory movement at either of said rates, a plurality of shifter means respectively for different of said reversers and each including a hand grip portion carried in said carriage for bodily movement therewith and for movement relative to the carriage in a path substantially parallel to the path of carriage movement, the hand grip portion for each of said shifter means being connected for reverser operation to effect carriage movement in the same direction that the hand grip is moved, and means for shifting one of said reversers to interrupting position upon shifting of the other reverser to either direction position thereof.

4. In a lathe the combination of a bed, a horizontal work spindle rotatably supported adjacent one end of said bed, a tool carriage guided on said bed for reciprocatory movement in a path parallel with the axis of said spindle, a quick traverse rate train including reverser shiftable friction clutch means for alternatively connecting or disconnecting the train and said carriage, a feed rate train including reverser positive clutch means for alternatively connecting or disconnecting the train and said carriage, and control means for said trains including a plurality of hand grips each carried by said carriage for bodily movement therewith, said hand grips being respectively connected for shifting different of said reverser clutch means.

5. In a lathe the combination of a bed, a horizontal work spindle rotatably supported adjacent one end of said bed, a tool carriage guided on said bed for reciprocatory movement in a path parallel with the axis of said spindle, a quick traverse rate train including reverser shiftable friction clutch means for alternatively connecting or disconnecting the train and said carriage, a feed rate train including reverser positive clutch means for alternatively connecting or disconnecting the train and said carriage, and control means for said trains including a plurality of hand grips each carried by said carriage for bodily movement therewith and for movement relative to the carriage in a path substantially parallel to the path of carriage movement, said hand grips being respectively connected for shifting different of said reversers in directions to effect carriage movement in the same direction that the hand grip is moved.

6. In a lathe the combination of a bed, a horizontal work spindle rotatably supported adjacent one end of said bed, a tool carriage guided on said bed for reciprocatory movement in a path parallel with the axis of said spindle, a quick traverse rate train including reverser shiftable friction clutch means for alternatively connecting or disconnecting the train and said carriage, a feed rate train including reverser positive clutch means for alternatively connecting or disconnecting the train and said carriage, control means for said trains including a plurality of hand grips each carried by said carriage for bodily movement therewith, said hand grips being respectively connected for shifting different of said reverser clutch means, and means for effecting disconnection of said feed rate train reverser upon engagement of said quick traverse rate train reverser in either direction position thereof.

7. In a lathe the combination of a bed, a horizontal tool spindle rotatably supported adjacent one end of said bed, a tool carriage guided on said bed for reciprocatory movement parallel with the axis of said spindle, a transmission for said reciprocatory movement including alternatively engageable or disengageable reverser clutch means, control means for engaging said reverser clutch means and retaining the clutch means in engaged position, and trip means operative to effect a disengaged position of said reverser clutch means during the carriage movement resulting from said engaged reverser clutch position.

8. In a lathe the combination of a bed, a horizontal tool spindle rotatably supported adjacent one end of said bed, a tool carriage guided on said bed for reciprocatory movement parallel with the axis of said spindle, a transmission for said reciprocatory movement including alternatively engageable or disengageable reverser clutch means, control means for engaging said reverser clutch means and retaining the clutch means in engaged position, and trip means operative to effect a disengaged position of said reverser clutch means during the carriage movement resulting from said engaged reverser clutch position, and trip means including a trip member, a plurality of trip elements selectively movable one at a time into a position to contact said member during the last mentioned carriage movement, and a trip connection operative to shift said reverser clutch means in accordance with said trip member and element contact.

9. In a lathe the combination of a bed, a horizontal work spindle rotatably supported adjacent one end of said bed, a tool carriage member guided on said bed for reciprocatory movement in a path parallel with the axis of said spindle, a cross slide member guided on said carriage for reciprocatory movement in a path transverse to said spindle axis, transmission mechanism for movement of said carriage member and of said cross slide member including elements shiftable to effect either member movement alternatively at feed or quick traverse rate in either direction of the reciprocatory movement thereof, and control means for said transmission mechanism including a plurality of pairs of shiftable hand grips each carried on said carriage member, the different pairs respectively controlling shifting of said transmission elements to effect the carriage member and cross slide member movement and the different hand grips of each pair controlling the shifting of said elements respectively to effect feed rate and quick traverse rate movement.

10. In a lathe the combination of a bed, a horizontal work spindle rotatably supported adjacent one end of said bed, a tool carriage member guided on said bed for reciprocatory movement in a path parallel with the axis of said spindle, a cross slide member guided on said carriage for reciprocatory movement in a path transverse to said spindle axis, transmission mechanism for movement of said carriage member and of said cross slide member including elements collectively shiftable to effect either member movement alternatively at feed or quick traverse rate in either direction of the reciprocatory movement thereof, and control means for said transmission mechanism including a plurality of pairs of shiftable hand grips each carried on said carriage member, the different pairs respectively controlling shifting of said transmission elements to effect the carriage member and cross slide member movement and the different hand grips of each pair controlling the shifting of said elements respectively to effect feed rate and quick traverse rate movement, said control means including a plurality of interlock means respectively associated with different said pairs of hand grips and each operative to disconnect a feed rate connection of said elements effected by the pair when the hand grips of the pair are shifted to effect a quick traverse rate connection of said elements.

11. In a lathe the combination of a bed, a horizontal work spindle rotatably supported adjacent one end of said bed, a tool carriage member guided on said bed for reciprocatory movement in a path parallel with the axis of said spindle, a cross slide member guided on said carriage for reciprocatory movement in a path transverse to said spindle axis, transmission mechanism for movement of said carriage member and of said cross slide member including elements collectively shiftable to effect either member movement alternatively at feed or quick traverse rate in either direction of the reciprocatory movement thereof, a first pair of hand grips carried on said carriage member for bodily movement therewith and each movable in a path substantially parallel with the carriage member movement, a second pair of hand grips carried on said carriage member for bodily movement therewith and each movable in a path substantially parallel with the cross slide member movement, transmission control connections operable between said shiftable transmission elements and the different hand grips of said first pair respectively to effect feed rate and quick traverse rate movement of said carriage member, and transmission control connections operable between said shiftable transmission elements and the different hand grips of said second pair respectively to effect feed rate and quick traverse rate movement of said cross slide member.

12. In a lathe the combination of a bed, a horizontal work spindle rotatably supported adjacent one end of said bed, a tool carriage member guided on said bed for reciprocatory movement in a path parallel with the axis of said spindle, a cross slide member guided on said carriage for reciprocatory movement in a path transverse to said spindle axis, transmission mechanism for movement of said carriage member and of said cross slide member including elements collectively shiftable to effect either member movement alternatively at feed or quick traverse rate in either direction of the reciprocatory movement thereof, a first pair of hand grips carried on said carriage member for bodily movement therewith and each movable in a path substantially parallel with the carriage member movement, a second pair of hand grips carried on said carriage member for bodily movement therewith and each movable in a path substantially parallel with the cross slide member movement, transmission control connections operable between said shiftable transmission elements and the different hand grips of said first pair respectively to effect feed rate and quick traverse rate movement of said carriage member, transmission control connections operable between said shiftable transmission elements and the different hand grips of said second pair respectively to effect feed rate and quick traverse rate movement of said cross slide member, and interlock means associated with said transmission control connections and operative to disconnect a feed rate connection of each of said members when the hand grips controlling the member are shifted to effect a quick traverse rate connection thereof.

13. In a lathe the combination of a bed, a horizontal work spindle rotatably supported adjacent one end of said bed, a tool carriage member guided on said bed for reciprocatory movement in a path parallel with the axis of said spindle, a cross slide member guided on said carriage for reciprocatory movement in a path transverse to said spindle axis, transmission mechanism for movement of said carriage member and of said cross slide member including elements collectively shiftable to effect either member movement alternatively at feed or quick traverse rate in either direction of the reciprocatory movement thereof, a first pair of hand grips carried on said carriage member for bodily movement therewith and each movable in a path substantially parallel with the carriage member movement, a second pair of hand grips carried on said carriage member for bodily movement therewith and each movable in a path substantially parallel with the cross slide member movement, transmission control connections operable between said shiftable transmission elements and the different hand grips of said first pair respectively to effect feed rate and quick traverse rate movement of said carriage member, and transmission control connections operable between said shiftable transmission elements and the different hand grips of said second pair respectively to effect feed rate and quick traverse rate movement of said cross slide member, said transmission connection being effective upon shifting of a hand grip of either of said pairs to effect movement of the member controlled thereby in the direction of the shifting of the hand grip.

14. In a lathe the combination of a bed, a horizontal work spindle rotatably supported adjacent one end of said bed, a tool carriage guided on said bed for reciprocatory movement in a path parallel with the axis of said spindle, feed rate and quick traverse rate shafts each carried by said bed and spaced apart in mutual parallelism with said spindle axis, a shiftable feed rate reverser and a shiftable quick traverse rate reverser each carried by said carriage for bodily reciprocatory movement therewith and respectively driven from said feed rate shaft and from said quick traverse rate shaft, and a plurality of manually operable controllers each carried by said carriage for reciprocatory movement therewith and respectively connected for operation of the different reversers whereby to actuate a tool carried on said carriage from one or the other of said shafts.

15. In a lathe the combination of a bed, a horizontal work spindle rotatably supported adjacent one end of said bed, a tool carriage member guided on said bed for reciprocatory movement in a path parallel with the spindle axis, a cross slide member guided on said carriage member for reciprocatory movement in a path transverse to the spindle axis, feed rate and quick traverse rate shafts each carried by said bed and spaced apart in mutual parallelism with said spindle axis, a plurality of shiftable feed rate reversers each driven from said feed rate shaft, a plurality of quick traverse rate reversers each driven from said quick traverse rate shaft, each of said reversers being carried by said carriage member for bodily reciprocatory movement therewith, and control means carried by said carriage member including means shiftable for alternative connection of one of said feed rate reversers or of one of said quick traverse rate reversers for movement of said carriage member and means shiftable for alternative connection of the other of said feed rate reversers or the other of said quick traverse rate reversers for movement of said cross slide member.

WERNER IRVING SENGER.